A. C. MILLER.
ANTI-BOLT-LOOSENING DEVICE.
APPLICATION FILED OCT. 8, 1917.
1,291,070.
Patented Jan. 14, 1919.
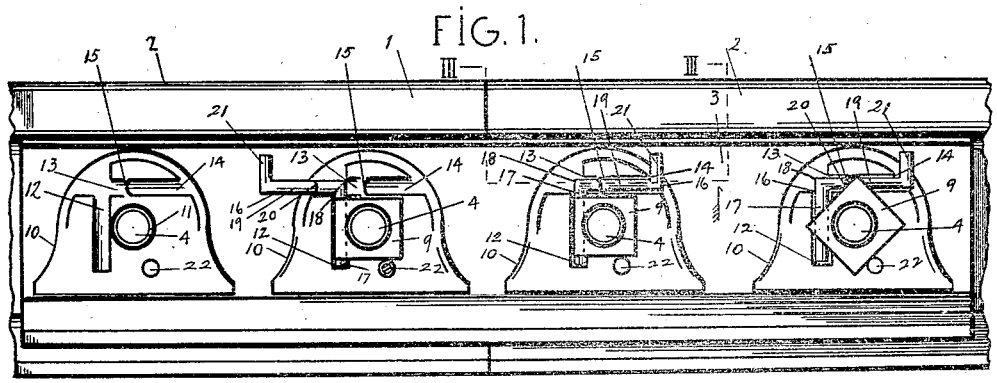
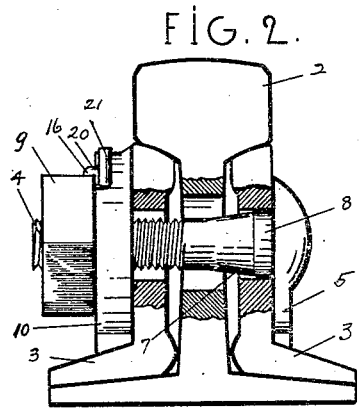
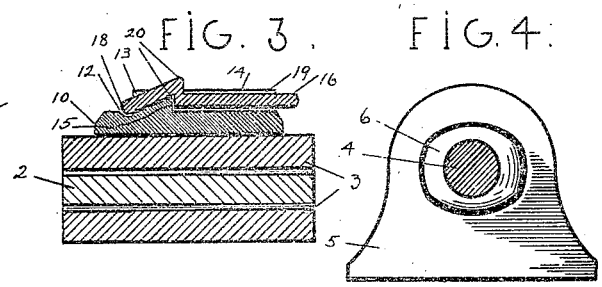
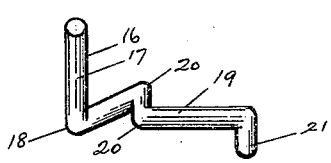
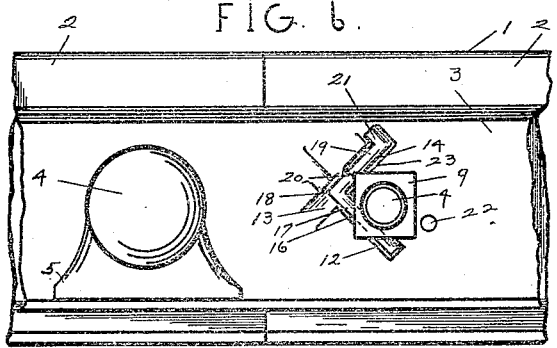
WITNESSES.
INVENTOR.
Alvin C. Miller.
By M. C. Gillham
Attorney.

UNITED STATES PATENT OFFICE.

ALVIN C. MILLER, OF KANSAS CITY, MISSOURI.

ANTI-BOLT-LOOSENING DEVICE.

1,291,070. Specification of Letters Patent. Patented Jan. 14, 1919.

Application filed October 8, 1917. Serial No. 195,294.

*To all whom it may concern:*

Be it known that I, ALVIN C. MILLER, a citizen of the United States, residing at Kansas City, in the county of Jackson and State of Missouri, have invented certain new and useful Improvements in Anti-Bolt-Loosening Devices, of which the following is a specification.

My invention relates to improvements in anti-loosening bolts, in which a non-rotatable bolt is employed in conjunction with a plate provided with a motion limiting stop to detain the nut.

It is my experience that tension adjustment of clamping bolts is frequently lost by the loosening of the nut from the bolt and by the loosening of the bolt from its nut, through the agency of shock received by the members clamped by the bolt, by corrosion and abrasion incident to the wear and tear in its environment. Moreover, I have noticed that when bolts are brought under tension by the leverage of a wrench, the nut is brought to bear upon the member clamped with great pressure, thereby taxing the tensile strength of the bolt, in which condition shock received by the clamped members will furnish the additional stress to break the bolt. To obtain and preserve adequate tension of the clamping bolt without injury to the same, I have provided a non-rotatable bolt and a selective motion limiting stop to detain or not detain its nut, so that the nut may be turned without undue pressure, to effect proper tensioning of the bolt and then detained by the motion limiting stop.

I attain these objects and advantages by means of the mechanism and devices illustrated in the drawing, in which—

Figure 1, is a side elevation of a rail joint to which my invention is applied, and showing the motion limiting stop in non-stop and stop position;

Fig. 2, is an end view partly in section of a rail and joint to which my invention is applied;

Fig. 3, is a horizontal section through the rail joint on the line III—III, in Fig. 1, and showing the limiting stop member in the channel sections in the holding plate and operatively engaged by the bulkhead;

Fig. 4, is an end view partly in section of the bolt associated with the holding plate, and showing the tapering lugged portion under its head and the head extension, parts of my invention;

Fig. 5, is a perspective view of the limiting stop, a part of my invention;

Fig. 6, is a side elevation of a rail joint to which my invention is applied, and showing the limiting stop operative in channel sections formed in the splice bar.

Referring to the drawing—the numeral 1, indicates a rail joint of the usual type, comprising rails 2, and clamped angle plates 3. The bolt 4, in this instance, is fairly representative of a plurality of bolts ordinarily used to hold the abutting rails in straight alinement. To prevent the bolt from rotating a foot portion 5, is formed integral with its head and is provided with suitable contour to engage and bear upon the adjacent base flange of the angle plate, the lower portion of the foot portion being broadened to provide leverage to resist force calculated to rotate the bolt. The shank of the bolt, under its head is expanded in elliptical formation, as shown at 6, in Fig. 4, and the expanded portion is tapered from adjacent the head, as shown at 7, in Fig. 2, the non-tapered residue of the expanded portion, preferably one eighth of an inch, is allowed to remain flattened, as shown at 8, in Fig. 2. This provision permits the bolt to be driven in place in the oval or elliptical hole in the angle plate, which driving of the bolt subjects it to frictional engagement with burrs and other well known inequalities in the wall of the punched hole, and thereby it reinforces the bolt head extension 5 to the extent of coöperating therewith to hold the bolt non-rotatable. The nut 9, is provided with internal screw threads, and the bolt with external screw threads, which will allow the turning of the nut by hand to its approximate adjustment with the clamped member, the maximum adjustment being, thereafter, attained by mechanical means, as for instance, a wrench. To hold the nut, after the same has been adjusted to produce the desired tension, a holding plate 10, is provided centrally with a hole 11, adapted to receive the bolt 4. At the left of the hole and within the field of the nut, a channel 12, having a concave bed, is formed in the holding plate and presented to the nut. The channel opens outwardly through the edge of the holding plate. A similar channel 13, is formed in the plate and extends laterally of the channel 12, and communicates therewith adjacent the opening mentioned. From the inner side of the channel 12, the channel 13, is formed shallow in upwardly inclined direction to zero, running out at a point a little distance inwardly of the channel 12. The bed of this channel is also formed concave. A channel 14, having uniform depth and a concave bed, is formed in the plate in continuance of the channel 13, but not communicating therewith, the inner end of the channel being located adjacent the inner zero end of the channel 13, thereby forming a bulkhead 15, to separate the channels into two sections, the bulkhead presenting a vertical face to the channel 14. The channels 13 and 14, are located, so that the angular portions of the nut shall bridge the same in the rotation of the nut, for a purpose hereinafter explained. Likewise the channel 12, is located nearer to the bolt hole, so that it shall be bridged by the nut at all times. A stop member 16, comprising a rod bent to form a pin portion 17, adapted to enter and occupy the channel 12, under the nut, and rotate therein, and an elbow 18, adapted to lie at the intersection of the channel with channel 13, and a flexed arm 19, adapted to lie in the channels 13 and 14, the inner end of the arm being adapted to enter the channel 13, and the outer end portion thereof adapted to enter the channel 14, thereby the arm is provided with a double shoulder 20, the upper shoulder being adapted to arrest and detain the nut in its backward rotation, and the lower shoulder to engage the vertical face of the bulkhead, when the arm is entered in the channels 13 and 14. A handle 21, is formed integral with the outer end of the arm to facilitate the turning of the stop 16. An index hole 22, is formed in the holding plate in the field of rotation of the nut, at a point that will indicate the stop position of the nut to hold the latter withdrawn from over the channels 13 and 14, so that the limiting stop 16, may enter and depart therefrom to detain and release the nut. The index hole is, preferably, adapted to receive the handle 21, of the limiting stop member 16. The provision of the index hole 22, is a convenience which enables the operator to obtain an accurate stop position for the nut, by inserting the handle 21, therein to arrest and detain the nut, just prior to the maximum tensioning of the bolt, thereby obviating the necessity for watching either the channels or the nut in the operation.

Although I show and describe a holding plate for assembly with the bolt, it is understood that the channels 12, 13 and 14, may be formed in the splice bars to occupy the same relative position to the nut to receive the motion limiting stop member 16, without departing from my invention or the scope of the appended claims, as shown at 23, in Fig. 6.

To apply my invention to joints and other claimed members the bolt is entered in and extended through the bolt holes prepared to receive it, the foot portion of the head of the bolt bearing upon a suitable integral projecting flange on the clamped member, or upon any similar or equivalent device attached to the member. This arrangement assures the non-rotatable character of the bolt. In the adjustment of the bolt to clamping plates having oval or elliptical holes, the same may be driven to place when provided with the tapered elliptical portion shown in Fig. 9, the adaptation of the bolt to the hole in the clamping plates provides additional facility for holding the bolt to prevent its rotation, either independently or in coöperation with the foot on the head of the bolt. When the bolt is in place, the holding plate is mounted thereon, on the screw end thereof, the foot of the holding plate being placed upon any suitable flange or other projection integral with or attached to the adjacent clamping plate or member clamped. This adjustment operates to hold the holding plate rigid and immovable. In placing the holding plate, the side having the channels 12, 13 and 14, is presented to the screw end portion of the bolt. The nut is then adjusted on the bolt and turned forwardly to adjacent the face of the holding plate to obtain the desired bolt tension, when the handle 21, of the stop member 16, is inserted in the index hole 22, and the nut thereafter turned until it contacts the handle mentioned, thus bringing the bolt in a position to clear the channels 13 and 14. The stop member 16, is then withdrawn from the index hole 22, and its pin portion 17, entered in the channel 12, the latter being bridged by the nut, forms adequate facility for holding the pin mentioned in the channel, wherein it will turn. The stop member 16, is then swung inwardly until its arm 19, shall lodge in the channels 14 and 13, the inner portion of the arm resting in the section 13, and its outer portion resting in the section 14, in which position the upper shoulder of the double shoulder 20, will extend upwardly a suitable distance above the plate, and in the field of the rotation of the nut, in position to arrest and detain the nut in its backward rotation, the lower shoulder thereof being engaged by the vertical face of the bulkhead 15, to arrest and detain the arm, and coöperate with the upper shoulder in detaining the nut. The nut is then turned backward until its angular portion is brought to and against the upper shoulder of the double shoulders 20, in which position the nut will be held to prevent its backward rotation, thereby the nut and, is prevented from loosening itself from the bolt. If it is desired to rotate the nut forwardly or backwardly, the stop member is swung away outwardly of the field of rotation of the nut.

The methods employed to secure bolts to prevent their rotative movement, or other movement, such as shake and like lateral movements, is determined by the conditions found presented by the environments. The anti-bolt loosening device I have shown and described is particularly adapted for use on railway rail-joints. The lugged shank of the bolt, under its head, being adapted to enter the oval holes of the angle bars under pressure to obtain a drive fit, thereby the bolt is held in place and rotative or other movement prevented, coöperating with the extension 5, of the head of the bolt for that purpose.

Having described my invention what I claim is—

1. The combination with a bolt and its nut, of a detainable plate pierced by the bolt and having a channel bridged over by the nut and a laterally extending channel communicating therewith and adapted to be bridged over by the angular portions of the nut, said last mentioned channel having a bulkhead to provide separate non-communicating channel sections, and a motion limiting stop member pivoting in said first mentioned channel and having a laterally exteneding arm adapted to enter the separate sections of said last mentioned channels and provided with an upwardly extending shoulder adapted to arrest and detain the nut in its backward rotation and with a downwardly extending shoulder adapted to engage the vertical face of said bulk-head to detain the arm in the channel.

2. The combination with a bolt and its nut, of a detainable plate pierced by the bolt and having a channel bridged over by the nut and a laterally extending channel communicating therewith and adapted to be bridged over by the angular portions of the nut and an index hole in the rotative field of the nut and adapted to receive a stop pin to arrest the nut when the latter is clear of said last mentioned channel, said last mentioned channel having a bulkhead to provide separate non-communicating channel sections, and a motion limiting stop member pivoting in said first mentioned channel and having a laterally extending arm adapted to enter the separate sections of said last mentioned channel and provided with an upwardly extending shoulder adapted to arrest and detain the nut in its backward rotation and with a downwardly extending shoulder adapted to engage the vertical face of said bulkhead to detain the arm in the channel.

3. In a device of the character described, a pair of plates having registering bolt holes, bolts extending loosely through the holes in one of said plates and having tapering lugged portions terminating in plane surfaces adapted to fit firmly in the holes in the other of said plates, the heads of said bolts having laterally extending portions adapted to bear on the lower portions of the adjacent plates to prevent rotative movement of the bolts, nuts on said bolts, nut holding plates having holes to receive the screw ends of the bolts and adapted to bear on the lower portions of the adjacent plates to prevent their rotative movement, said nut holding plates having channels permanently bridged over by the nuts and laterally extending channels communicating therewith and adapted to be bridged over by the angular portions of the nuts, said last mentioned channels having bulkheads to provide separate non-communicating channel sections, and motion limiting stops pivoting in said first mentioned channels and provided with shoulders adapted to engage the vertical faces of said bulkheads and detain the arms in the channels.

4. In a device of the character described, a pair of plates having registering bolt holes, bolts extending loosely through the holes in one of said plates and having tapering lugged portions terminating in plane surfaces adapted to fit firmly in the holes in the other of the plates, the heads of the bolts having laterally extending portions adapted to bear on the lower portions of the adjacent plate and prevent rotative movement of the bolts, nuts on said bolts, channels formed in one of said plates and permanently bridged over by said nuts and laterally extending channels communicating therewith and adapted to be bridged over by the angular portions of said nuts, said last mentioned channels having bulkheads to provide separate non-communicating channel sections, and motion limiting stops pivoting in said first mentioned channels and having laterally extending arms adapted to enter the separate sections in said last mentioned channels and having shoulders adapted to arrest and detain the nuts in their backward rotation and with shoulders adapted to engage the vertical faces of said bulkheads and detain the arms in the channels.

5. The combination with a pair of rails and a pair of angle bars arranged at opposite sides thereof and provided with bolt holes registering with bolt holes in said rails, bolts extending loosely through the rails and through one of the angle bars and having tapering lugged portions terminating in plane surfaces adapted to firmly fit in the holes in the other of the angle bars, the heads of the bolts having laterally extending portions adapted to bear against the lower portions of the adjacent angle bars and prevent rotative movement of the bolts, nuts on said bolts, nut holding plates mounted on said bolts and adapted to bear against the lower portions of the adjacent angle bar and prevent their rotative movement, said nut holding plates having channels adapted to be bridged over by the nuts and laterally extending channels communicating therewith and adapted to be bridged over by the angular portions of the nuts, said last mentioned channels having bulkheads to provide separate non-communicating channel sections, and motion limiting stops pivoting in said first mentioned channels and provided with laterally extending arms adapted to enter the separate sections in said last mentioned channels and having shoulders adapted to arrest and detain the nuts in their backward rotation and shoulders adapted to engage the vertical faces of said bulkheads and detain the arms in the channels.

Kansas City, Mo., October 2, 1917.
ALVIN C. MILLER.

Witnesses:
F. E. KENNEY,
MARION TIFFANY.

Copies of this patent may be obtained for five cents each, by addressing the "Commissioner of Patents, Washington, D. C."